Dec. 10, 1935. R. F. DARBY 2,023,667
TRUCK
Filed Aug. 5, 1932 3 Sheets-Sheet 1
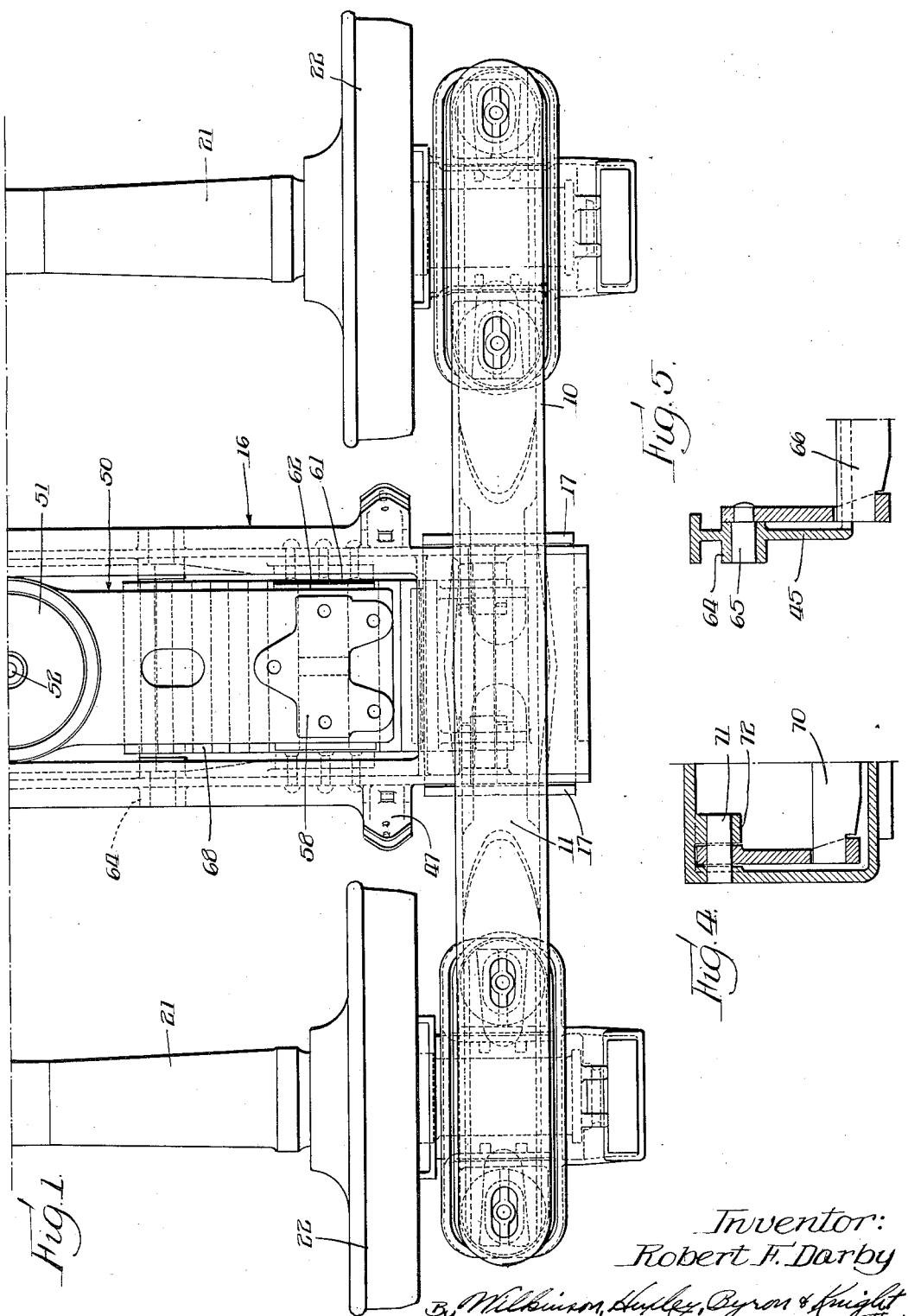
Inventor:
Robert F. Darby
By Wilkinson, Huxley, Byron & Knight
attys Dec. 10, 1935.  R. F. DARBY  2,023,667
TRUCK
Filed Aug. 5, 1932  3 Sheets-Sheet 2
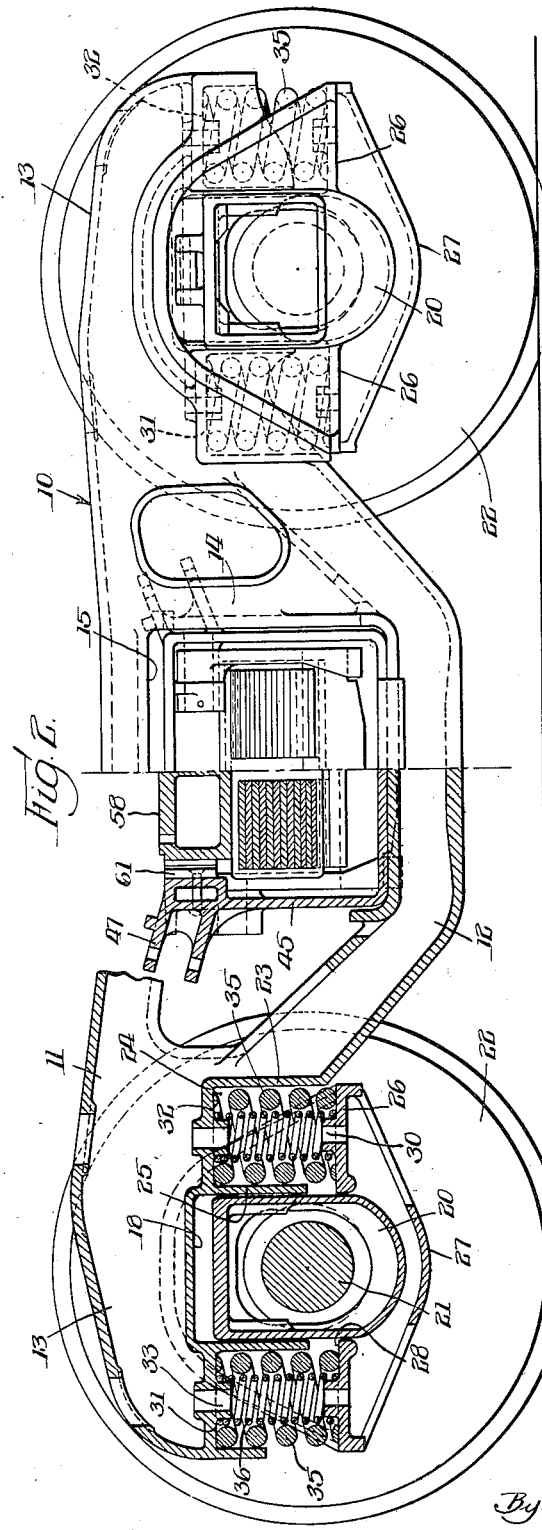
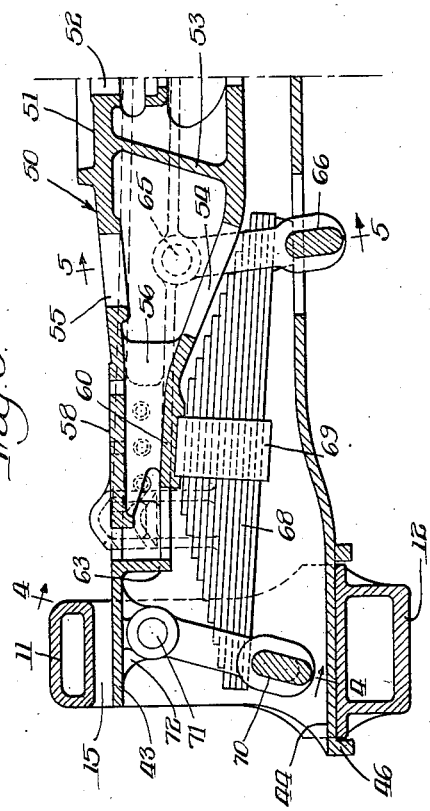
Inventor:
Robert F. Darby,
By: Wilkinson, Huxley, Byron & Knight
attys.

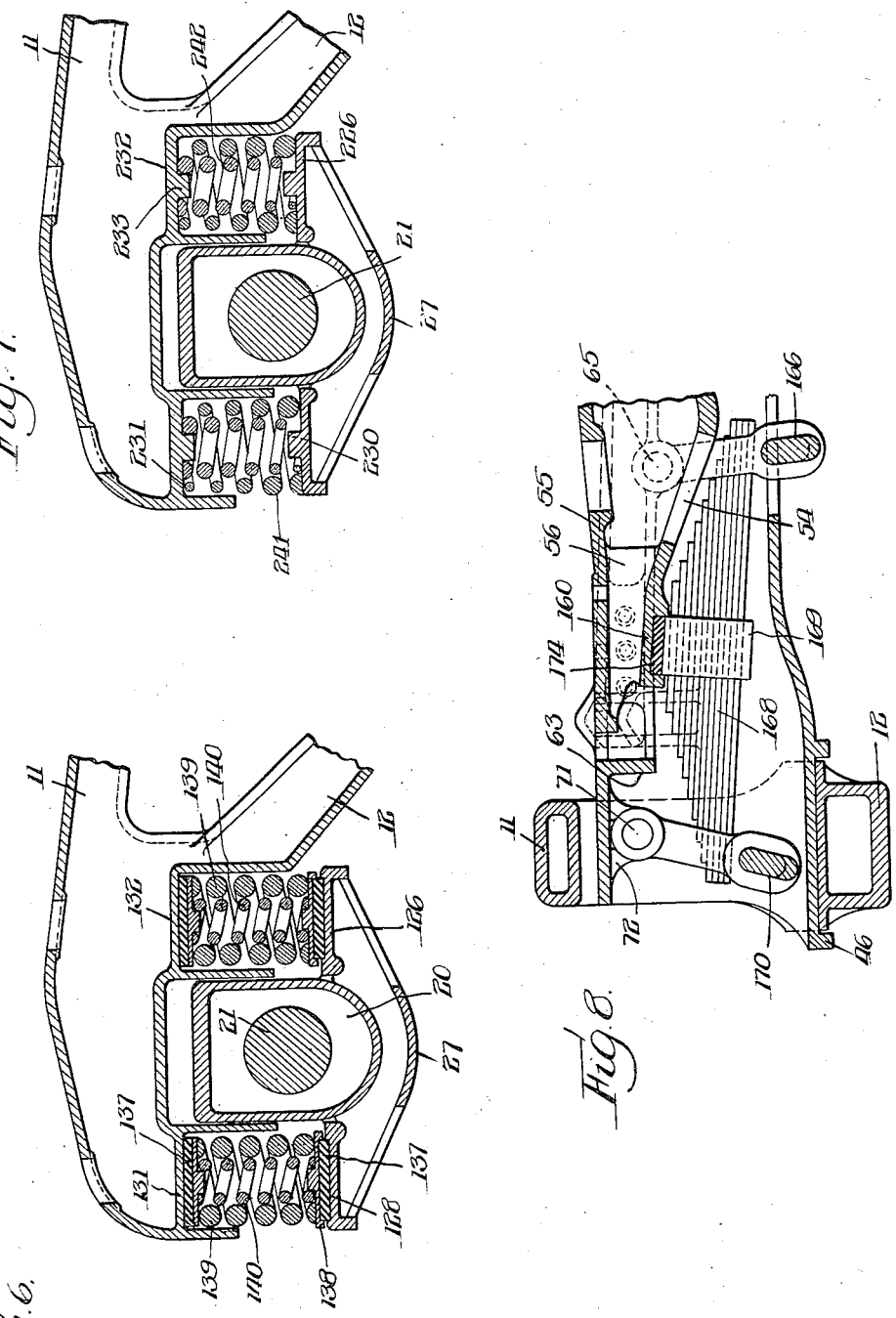

Patented Dec. 10, 1935

2,023,667

UNITED STATES PATENT OFFICE 2,023,667

TRUCK

Robert F. Darby, Oak Park, Ill., assignor to American Steel Foundries, Chicago, Ill., a corporation of New Jersey Application August 5, 1932, Serial No. 627,636

8 Claims. (Cl. 105—203)

The invention relates to truck construction and has particular reference to a truck arrangement for freight cars having improved riding qualities permitting high speed operation and wherein the cost of construction will be below that of passenger car trucks.

An object of the invention is to provide a four-wheel truck which is inexpensive to make and maintain, which will be of rugged construction, and one having riding qualities approximating those of a passenger truck of improved design.

A further object is to provide a truck having a spring arrangement associated with each journal box and designed to prevent tilting and binding of the journal boxes in their pedestals all in combination with an elliptical spring mounting for the bolster for snubbing and equalizing the light loads and absorbing the large changes in load due to car roll.

A further object is to provide a truck construction wherein improved riding qualities are secured through the provision of two types of springs arranged in series so that they may operate independently without a common period of oscillation. Accordingly, the invention contemplates the location of coil springs adjacent the journal boxes and leaf springs between the transom and truck bolster, the latter operating as a spring and also as an equalizer to cause dampening of the oscillations of the coil springs.

A further object is to provide a truck which will give riding qualities comparable both vertically and laterally to those of a passenger car truck and which will have a lighter weight with simplicity in construction and less cost.

With these and various other objects in view, the invention may consist of certain novel features of construction and operation, as will be more fully described and particularly pointed out in the specification, drawings and claims appended hereto.

In the drawings which illustrate an embodiment of the device and wherein like reference charcters are used to designate like parts—

Figure 1 is a fragmentary top plan view of an improved truck constructed in accordance with the present invention;

Figure 2 is a side elevation of the truck shown in Figure 1 with one half in section to show details of construction;

Figure 3 is a fragmentary transverse sectional view taken substantially on the transverse center line of the truck;

Figure 4 is a fragmentary detail view taken substantially along line 4—4 of Figure 3 and showing the mounting for the outer spring hangers;

Figure 5 is a fragmentary detail view taken substantially along line 5—5 of Figure 3 and showing the mounting for the inner spring hanger;

Figures 6 and 7 are fragmentary longitudinal sectional views showing modifications in the spring arrangement for supporting the side frame from the journal boxes; and Figure 8 is a fragmentary transverse sectional view taken substantially on the transverse center line of the truck and showing a modified construction for supporting the bolster on the elliptical springs.

Referring more particularly to the drawings, in the form of truck disclosed the side frame 10 is of integral construction and consists of a compression member 11 and tension member 12 merging adjacent their ends as at 13 and being spaced and connected intermediate their ends by the bolster columns 14. The bolster columns, compression and tension member provide a rectangular opening 15 for receiving the ends of the transom indicated in its entirety by 16, Figure 1, and accordingly, the bolster columns are provided with flanges 17 for engaging with the side walls of the transom. As the truck is symmetrical in construction the drawings and description apply only to one side in order to eliminate duplication of disclosure.

Each end 13 of the side frame has a pocket 18 formed therein for the reception of a journal box 20 receiving the end 21 of the wheel and axle assembly having wheels 22. The integral depending walls 23 of the side frame form spring receiving pockets 24, the inner portions 25 of the walls having a depth to form guide walls by means of which the journal box 20 is guided in its relative vertical movements. Each journal box 20 has a main journal receiving box portion and integrally formed laterally extending brackets 26 on opposite sides thereof, the brackets being strengthened by the connecting integrally formed flange 27 extending below the box portion. Seats 28 are provided by the brackets 26 for receiving spring nests positioned by dowels 30, the spring nests being disposed between each seat 28 and seats 31 and 32, provided on the side frame, the latter seats being also provided with dowels 33 for positioning the spring nests in a manner similar to dowels 30.

In the preferred form the spring nests consist of a relatively stiff outer spring 35 having convolutions of uniform diameter arranged concentrically with an inner relatively light and resilient coil spring 36. In the modification disclosed by Figure 6 the spring seats 128, provided by the brackets 126, are formed without the positioning dowels, in order to properly seat the rubber pads 137 on which are fitted wear plates 138. The seats 131 and 132 provided by the truck frame in a similar manner receive rubber pads 137 on which are mounted wear plates, the opposed wear plates having positioned therebetween nests of concentric coil springs 139 and 140. In this modification the coil springs more nearly approximate each other in stiffness.

In Figure 7 another modification of journal box is shown in which brackets 226 are provided with integrally upstanding bosses 230 for receiving a nest of springs positioned thereby, while in a similar manner the truck frame providing the spring seats 231 and 232 is also provided with bosses 233 for positioning the nests of coil springs disposed between the opposing spring seats. The outer coil spring 241 in this modification is formed from a tapering rod so that the convolutions at the base of the spring have a greater relative stiffness than those in engagement with the spring seats on the truck frame. Also the inner spring 242 is formed from a tapering rod of smaller average circular cross section and is positioned with its relatively stiff base convolutions in contact with the spring seats on the truck frame so that they are located adjacent the more resilient convolutions of the outer spring.

The top and bottom walls 43 and 44 of the transom are joined by the transverse spaced members 45 to provide box-like ends on the transom member, the guide flanges 17 on the side frame embracing the side walls 45 of the transom, while the bottom wall 44 is provided with depending lugs 46 for engaging the tension member 12 of the side frame and positioning the transom thereon. The transom intermediate the box-like ends is substantially of U-section and provides brackets 47 for supporting the brake rigging not shown. A bolster 50 is disposed centrally of the transom between the spaced side walls 45 and the box-like end structures and is provided with a center plate 51 having a king pin opening 52 therein, the plate being reinforced by diagonal strut members 53. Tension and compression members 54 and 55, extending outwardly on both sides of the center structure, complete the bolster, the members being connected adjacent their ends by a web 56 located adjacent the side bearings 58 and above and substantially in alignment with the spring seat 60.

As more clearly shown in Figure 1, the bolster and transom are provided with guide members 61 and 62 and excessive side movement of the bolster is prevented by co-operation between the depending guide stop 63 provided on the transom and for engagement with the ends of the bolster.

Adjacent the longitudinal center line of the truck the transom is provided with bearings 64 formed integral with the side walls 45 for receiving the pivot shafts 65 projecting from the arms of the U-shaped inner spring hanger 66. This hanger serves as the inner support for the leaf spring assembly 68, the spring band thereof cooperating with the spring seat 60 on the end of the bolster.

The opposite end of the leaf spring assembly 68 is swung on the spring hanger 70, the arms of the hanger being pivotally mounted in the end of the transom by means of the pivot shaft 71 journalled in suitable bearings 72 provided by the transom as shown in Figure 4.

In the modified structure of Figure 8 the leaf spring assembly 168 is supported from the bolster at its inner end by a spring hanger 166 and at its outer end by spring hanger 170 in the same manner as described in connection with the preferred embodiment. However, the spring band 169 instead of having direct contact with the bolster has indirect contact therewith, there being interposed between the spring band and seat 160 on the bolster the resilient block 174 of rubber or other suitable material, the rubber material having the effect of absorbing the slight jars, thus functioning as cushioning means between the parts.

In a truck of the character described improved riding qualities are secured through the provision of different types of springs which by their arrangement in series operate independently and without a common period of oscillation. The helical springs respond quickly to a change of load and have a recoil equal to their absorbed energy, whereas, elliptical springs respond more slowly to a change in load as they have a recoil equal to the absorbed energy minus the friction between the leaves. The present form of truck has riding qualities comparable both vertically and laterally to those of a passenger car truck since the helical springs effectively absorb the vertical movements, while the elliptical springs take care of the large change in loads due to car roll and further perform the function of a snubber and equalizer under light loads.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a car truck, the combination of a side frame including tension and compression members merging adjacent the ends thereof and provided with pedestal jaws, journal boxes slidably mounted in said jaws and cooperating with the journal ends of wheel and axle assemblies, spring seats on said journal boxes, spring seats on said side frame aligned with said first named spring seats, coil springs between said spring seats, spaced columns integrally connecting said tension and compression members and forming a window therewith, a transom, said transom including spaced side members and a substantially continuous bottom member forming a substantially U-shaped construction between the ends of said transom, a top connecting end member connecting said spaced side members whereby a box-shaped end is provided, said end extending into said window and being non-resiliently supported on said tension member, swing hangers pivoted to said spaced side members and to said top connecting member, a semi-elliptic spring supported on said swing hangers, and a bolster supported on said spring intermediate the ends thereof.

2. In a car truck, the combination of a side frame including tension and compression members merging adjacent the ends thereof and provided with pedestal jaws, journal boxes slidably mounted in said jaws and cooperating with the journal ends of wheel and axle assemblies, spring seats on said journal boxes, spring seats on said side frame aligned with said first named spring seats, coil springs between said spring seats, spaced columns integrally connecting said tension and compression members and forming a window therewith, a transom, said transom including spaced side members and a substantially continuous bottom member forming a substantially U-shaped construction between the ends of said transom, a top connecting end member connecting said spaced side members whereby a box-shaped end is provided, said end extending into said window and being non-resiliently supported on said tension member, swing hangers pivoted to said spaced side members and to said transom within said box section, a semi-elliptic spring supported on said swing hangers, and a bolster supported on said spring intermediate the ends thereof.

3. In a car truck, the combination of a side frame including tension and compression members merging adjacent the ends thereof and provided with pedestal jaws, journal boxes slidably mounted in said jaws and cooperating with the journal ends of wheel and axle assemblies, spring seats on said journal boxes, spring seats on said side frame aligned with said first named spring seats, coil springs between said spring seats, spaced columns integrally connecting said tension and compression members and forming a window therewith, a transom, said transom including spaced side members and a substantially continuous bottom member forming a substantially U-shaped construction between the ends of said transom, a top connecting end member connecting said spaced side members whereby a box-shaped end is provided, said end extending into said window and being non-resiliently supported on said tension member, swing hangers pivoted to said spaced side members and to said top connecting member, a semi-elliptic spring supported on said swing hangers, and a bolster supported on resilient means disposed on said spring intermediate the ends thereof.

4. In a car truck, the combination of a side frame including tension and compression members merging adjacent the ends thereof and provided with pedestal jaws, journal boxes slidably mounted in said jaws and cooperating with the journal ends of wheel and axle assemblies, spring seats on said journal boxes, spring seats on said side frame aligned with said first named spring seats, coil springs between said spring seats, spaced columns integrally connecting said tension and compression members and forming a window therewith, a transom, said transom including spaced side members and a substantially continuous bottom member forming a substantially U-shaped construction between the ends of said transom, a top connecting end member connecting said spaced side members whereby a box-shaped end is provided, said end extending into said window and being non-resiliently supported on said tension member, swing hangers pivoted to said spaced side members and to said top connecting member, friction means supported on said swing hangers, and a bolster supported on said friction means intermediate the ends thereof.

5. In a car truck, the combination of a side frame including tension and compression members merging adjacent the ends thereof and adapted to have cooperative engagement with journal means of wheel and axle assemblies, spaced columns integrally connecting said tension and compression members and forming a window therewith, a transom, said transom including spaced side members and a substantially continuous bottom member forming a substantially U-shaped construction between the ends of said transom, a top connecting end member connecting said spaced side members whereby a box-shaped end is provided, said end extending into said window and non-resiliently supported on said tension member, swing hangers pivoted to said spaced side members and to said top connecting member, a semi-elliptic spring supported on said swing hangers, and a bolster supported on said spring intermediate the ends thereof.

6. In a car truck, the combination of a side frame including tension and compression members merging adjacent the ends thereof and adapted to have cooperative engagement with journal means of wheel and axle assemblies, spaced columns integrally connecting said tension and compression members and forming a window therewith, a transom, said transom including spaced side members and a substantially continuous bottom member forming a substantially U-shaped construction between the ends of said transom, a top connecting end member connecting said spaced side members whereby a box-shaped end is provided, said end extending into said window and being non-resiliently supported on said tension member, swing hangers pivoted to said spaced side members and to said top connecting member, one of said swing hangers extending through an aperture provided in said bottom member, a semi-elliptic spring supported on said swing hangers, and a bolster supported on said spring intermediate the ends thereof.

7. A transom including spaced side members, a bottom substantially continuous web connecting said side members, top end connecting members disposed between said side members and having a bolster stop thereon whereby a substantially box-shaped end section is formed, and means in said box section and on said side members for pivotally connecting swing hangers thereto, said continuous web being apertured adjacent one of said last named means for permitting the passage of a swing hanger therethrough.

8. A transom including spaced side members, a bottom substantially continuous web connecting said side members, top end connecting members disposed between said side members and having a bolster stop thereon, and means on said end members and said side members for pivotally connecting swing hangers thereto, said continuous web being apertured adjacent one of said last named means for permitting the passage of a swing hanger therethrough.

ROBERT F. DARBY.